M. KUSCH.
PUTREFACTION CHAMBER.
APPLICATION FILED JAN. 27, 1914.

1,123,320.

Patented Jan. 5, 1915.

2 SHEETS—SHEET 1.

Witnesses:
B. M. Stucker
C. H. Fesler

Inventor:
Max Kusch
By Owen Cushman & Rea
attys

M. KUSCH.
PUTREFACTION CHAMBER.
APPLICATION FILED JAN. 27, 1914.
1,123,320.
Patented Jan. 5, 1915.
2 SHEETS—SHEET 2.
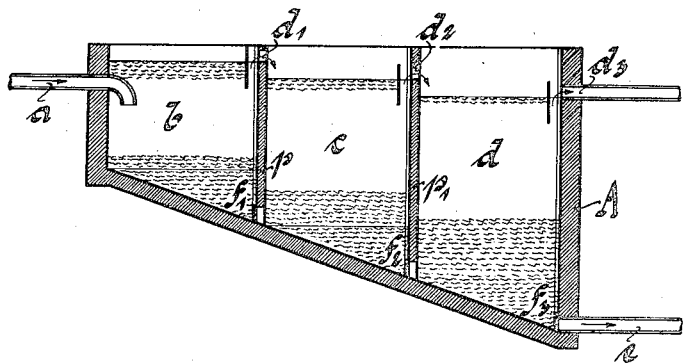
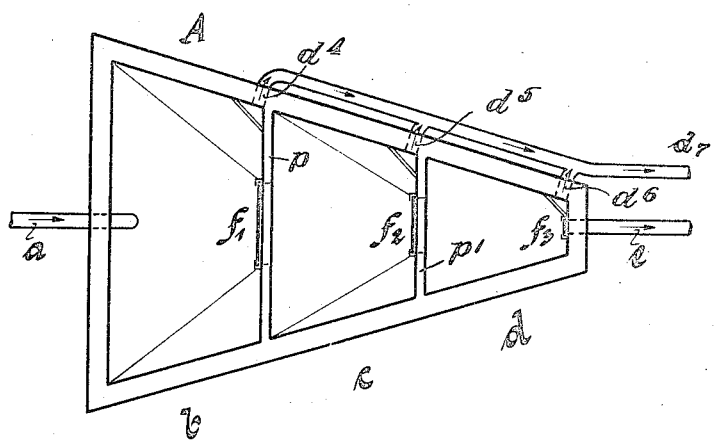
Witnesses
J. L. Hanlein
H. P. Hollingsworth
Inventor
Max Kusch
by
Attorneys

UNITED STATES PATENT OFFICE.

MAX KUSCH, OF FRIEDENAU, NEAR BERLIN, GERMANY.

PUTREFACTION-CHAMBER.

1,123,320.  Specification of Letters Patent.  Patented Jan. 5, 1915.

Application filed January 27, 1914. Serial No. 814,727.

*To all whom it may concern:*

Be it known that I, MAX KUSCH, a citizen of the German Empire, and residing at Friedenau, near Berlin, Germany, have invented certain new and useful Improvements in Putrefaction-Chambers, of which the following is a specification.

My invention relates to putrefaction chambers for sewage plants.

When sewage containing light organic constituents is to be treated, in consequence of the considerable amount of fermenting mud which constantly forms it has been found preferable not to allow the precipitated mud to putrefy in putrefaction mud chambers directly connected with the settling chambers, but in separate putrefaction chambers. Accordingly, I provide that the fermenting mud which floats at the top of the sewage and is produced in large quantities at the beginning of the putrefaction is contained in a sufficiently large chamber and, in addition, that the gases which are important for enabling the mud to be dried are still present in sufficiently large quantities in the purified mud when the latter is run off.

According to my invention, the individual compartments in a putrefaction chamber are completely separated from one another by partitions provided at the bottom with normally closed openings, and are so arranged that the first compartment is relatively shallow but has a considerable area of water-level, while the following compartments are successively deeper and have a gradually diminishing area of water-level. When the chamber is in use the mud is conveyed from one compartment into the next not by means of freshly entering mud, but under the actiton of gravity from time to time as required by opening the said openings in the partitions.

One illustrative embodiment of the invention is represented by way of example in the accompanying drawing, wherein:—

Figure 1:
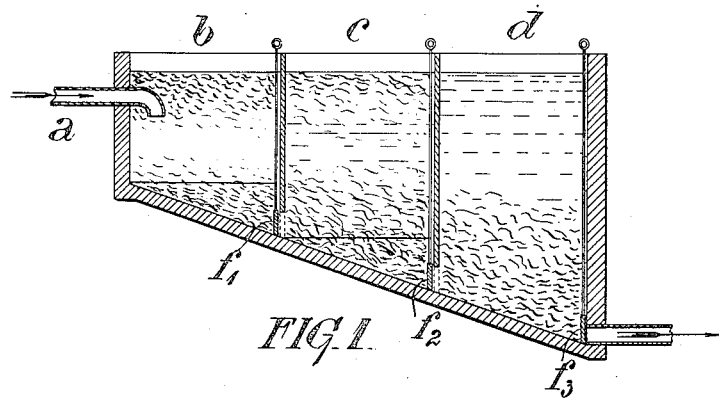
Figure 2:
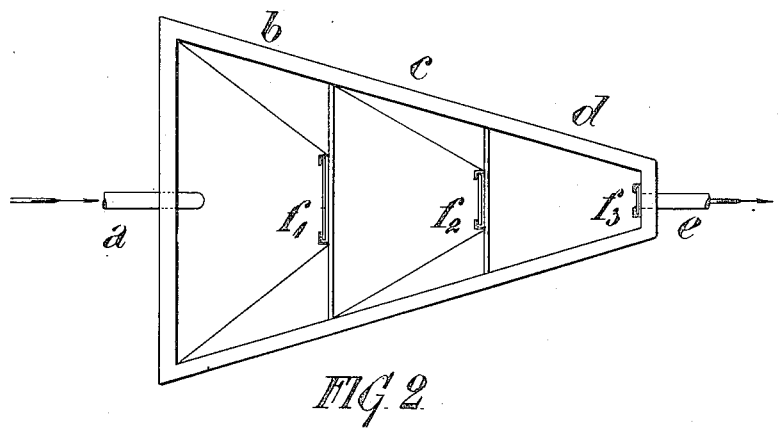
Figure 3:
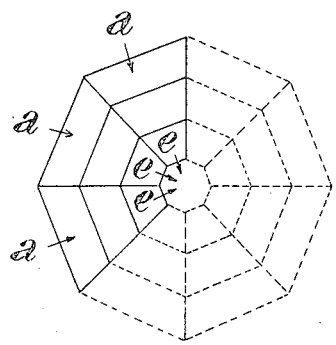

Figure 1 is a longitudinal section, and Fig. 2 a top plan view showing one preferred form of my improved putrefaction chamber, and Fig. 3 is a plan view of a group of such chambers having a common mud discharge pipe. Figs. 4 and 5 are respectively a longitudinal section and a plan view of the putrefaction chamber showing different means for drawing off the water above the settled mud.

Referring to the drawing, the putrefaction chamber A is divided by partitions $p, p_1$ into compartments $b$, $c$ and $d$. The mud is supplied through the pipe $a$ into the first compartment $b$ and begins to putrefy here, a floating layer of fermenting mud of considerable thickness being formed. After the gate-valve $f_1$ of the partition $p$ has been opened the mud in process of putrefaction flows into the next compartment $c$ where the putrefaction takes place in less putrid water and a smaller quantity of fermenting mud is formed. After the gate-valve $f_2$ in the partition $p_1$ has been opened the mud flows into the next compartment $d$ in which it is located in practically purified water and therefore hardly any fermenting mud is formed, but the putrefaction takes place only with the generation of gas and the mud can therefore be completely purified. On opening the gate-valve $f_3$ the purified mud is discharged through the pipe $e$ in known manner, for example under the pressure of water. Obviously the size of the putrefaction chamber must be such that the mud remains therein for a sufficient time, and the number of compartments, of which there must be at least two, will vary according to the nature of the mud under treatment. If it is necessary to draw off the turbid water above the mud this can be done in known manner either from the one into the next compartment, or directly from the individual compartments to outside the chamber.

In Fig. 4 is illustrated a putrefaction chamber formed of several compartments divided by partitions as in Fig. 1 which for the better conveying of the mud from one compartment into the next the water level of the receiving compartment is preferably maintained at a lower plane than in the compartment previously containing the mud, and the turbid water is drained from the higher into the lower compartment through overflow openings $d_1$, $d_2$, in the partitions $p$, $p_1$, and finally through an overflow $d_3$ from the lowermost of the compartments.

In Fig. 5 instead of the water draining from one compartment into another, each compartment has an overflow as shown at $d^4$, $d^5$, $d^6$, to the outside of the putrefaction chamber and there discharge into a common outlet pipe $d^7$ which carries the water from the chamber.

I claim:—

1. A putrefaction chamber having an outlet divided into a plurality of normally closed compartments adapted to be connected one to another, the cross-sectional area of the upper part of each compartment being greater than, and the depth thereof less than the corresponding area and depth of the compartment next thereto nearer the outlet.

2. The combination of a plurality of putrefaction chambers each having an outlet opening into a common discharge chamber or space formed by the chambers, each chamber comprising a plurality of normally closed compartments adapted to open one into another, the cross-sectional area and the average depth of each compartment in any one chamber being respectively greater and less than the same dimensions of the compartment next thereto in the same chamber nearer the discharge chamber.

3. A putrefaction chamber having an outlet divided into a plurality of normally closed compartments adapted to be connected one to another, the cross-sectional area of the upper part of each compartment being greater than, and the depth thereof less than the corresponding area and depth of the compartment next thereto nearer the outlet, and each compartment having an overflow into the next thereto nearer the outlet at successively lower levels.

In testimony whereof, I affix my signature in the presence of two witnesses.

MAX KUSCH.

Witnesses:
  WOLDEMAR HAUPT,
  HENRY HASPER.